United States Patent Office.

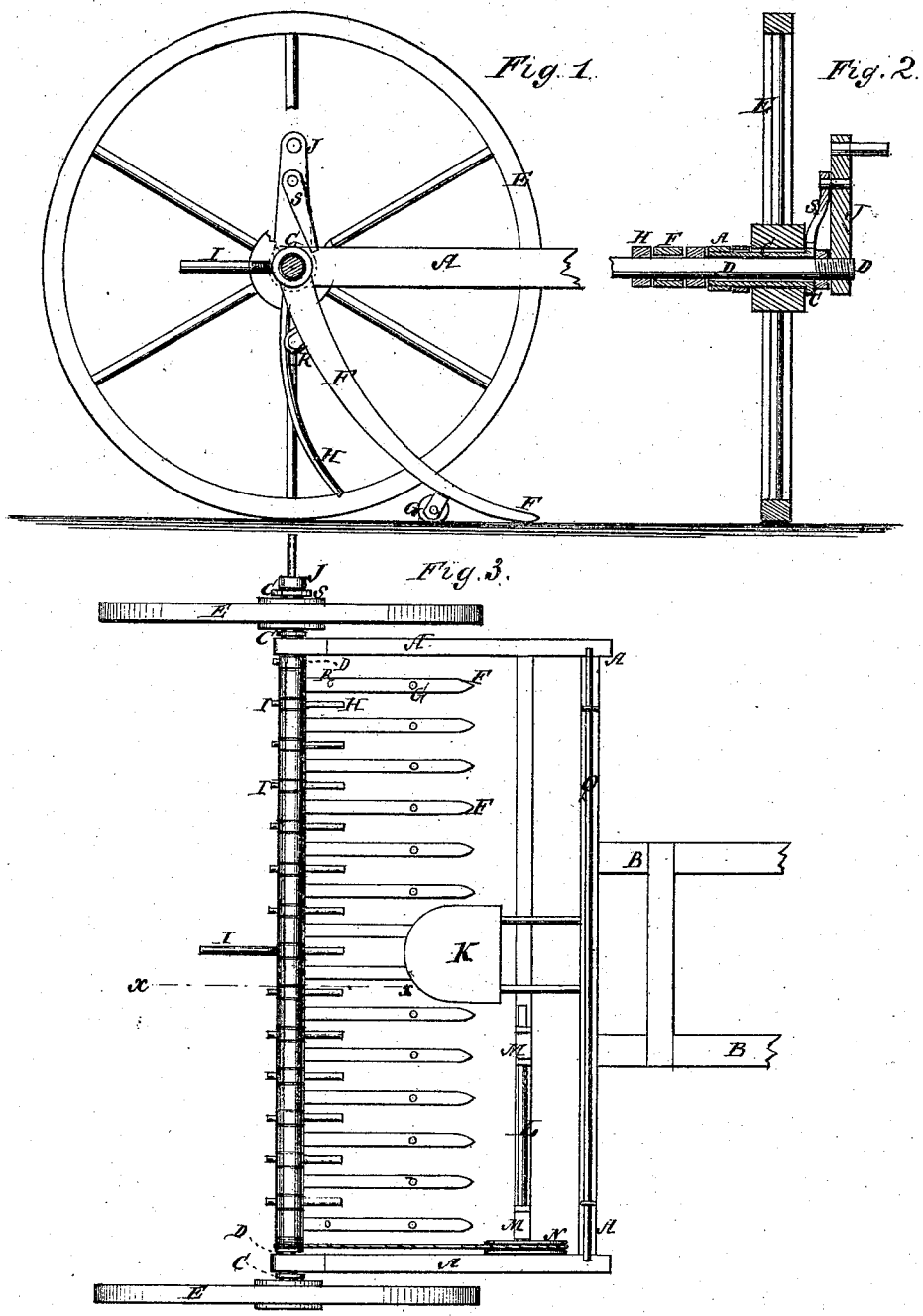

WILLIAM H. FAY, OF CAMDEN, NEW JERSEY.

Letters Patent No. 104,131, dated June 14, 1870.

IMPROVEMENT IN HORSE HAY-RAKES.

The Schedule referred to in these Letters Patent and making part of the same

*To all whom it may concern:*

Be it known that I, WILLIAM H. FAY, of Camden, in the county of Camden and State of New Jersey, have invented a new and useful Improvement in Horse Hay-Rake; and I do hereby declare that the following is a full, clear, and exact description thereof, which will enable others skilled in the art to make and use the same, reference being had to the accompanying drawing forming part of this specification.

Figure 1 is a detail sectional view of my improved horse hay-rake, taken through the line *x x,* fig. 3.

Figure 2 is a detail sectional view of the same, taken through one of the wheels.

Figure 3 is a top view of the same.

Similar letters of reference indicate corresponding parts.

My invention has for its object to furnish an improved horse hay-rake, which shall be so constructed as to work with the same facility upon uneven as upon even ground, which will collect the hay and grain free from dust or dirt, and which will not injure or tear up the roots of the grass; and It consists in the construction and arrangement of various parts of the machine, as hereinafter more fully described.

A' is the frame, to the middle of the forward part of which are rigidly attached the shafts B, to which is attached the horse or horses by which the machine is drawn.

To the rear ends of the side bars of the frame A are securely and rigidly attached sleeves C, through which passes and in which revolves the shaft D, and upon the outer part of which sleeves C are formed the axles or journals upon which the wheels E revolve.

F are the rake-teeth, through holes in the upper or rear ends of which the shaft D passes, so that the said rake-teeth F may each work independently of the others, and may thus conform to the surface of the ground, whether said surface be uneven or even.

The forward ends or points of the teeth F are held away from the ground by the small caster-wheels G, which are pivoted to the forward parts of said teeth, as shown in fig. 1, to hold the points of the teeth away from the ground, and thus prevent the roots of the grass from being torn up or injured by the said teeth F. The forward ends of the teeth F may be kept from lateral movement or play, if desired, by short braces, the forward ends of which are bolted to the sides of the rear parts of the said teeth F, and through holes in the rear ends of which the shaft D passes.

H are fingers, which are made of such a length as to be clear of the ground when hanging down vertically, as shown in fig. 1.

The shaft D passes through holes in the upper ends of the fingers H, which fingers are adjustably secured to the said shaft D by set-screws I, as shown in figs. 1 and 3, so as to be carried around by and with the said shaft in its revolution.

One of the set-screws I, preferably the central one, is made long, to serve as an arm for the purpose hereinafter described.

To one of the projecting ends of the shaft D is attached a crank, J, so that the driver, by turning the crank J once, can revolve the shaft D, which carries the fingers H with it, raising the collected hay or grain from the teeth F, and depositing it in a snug, close windrow. This same thing may be done by the driver from his seat, K, by attaching the crank J to the end of the short shaft L, which revolves in bearings in the upper ends of the standards M, the lower ends of which are secured to the frame A.

To the other or outer end of the shaft L is attached a band-wheel or pulley, N, around which passes the band or chain O, which also passes around a pulley, P, attached to the shaft D, so that the shaft D and fingers H may be revolved to discharge the hay or grain by revolving the shaft L.

Q is a rod or bar, which, when not in use, is carried upon the forward part of the frame A, as shown in fig. 3.

When passing from place to place, the rod Q is passed through the eyes of the eye-bolts or keepers, R, attached to the rear side of the upper part of the two outer teeth F. Then, by turning the crank J until the pawl S, pivoted to its inner side, drops into a notch upon the upper part of the sleeve C, the long set-screw or arm I will strike against the rod or bar Q, and raise and hold the teeth and fingers away from the ground.

Having thus described my invention,

I claim as new and desire to secure by Letters Patent—

1. The arrangement, on the same shaft, D, of the teeth F, working loosely and independently thereon, and the fingers H, secured adjustably to said shaft by set-screws I, as herein shown and described 2. The arrangement of the fingers H, sleeve C, and crank J, with the shaft D, teeth F, frame A, and wheels E, substantially as herein shown and described, and for the purpose set forth.

3. The arrangement of the rod or bar Q, eye-bolts or keepers R, and pawl S, with the teeth F, fingers H, shaft D, frame A, wheels E, notched sleeve C, and crank J, substantially as herein shown and described, and for the purpose set forth.

WILLIAM H. FAY.

Witnesses:
JAMES M. CASSADY,
FRANK BOARDMAN,
T. W. FAY.